United States Patent [19]

Hamar et al.

[11] Patent Number: 4,538,392
[45] Date of Patent: Sep. 3, 1985

[54] PORTABLE SECTIONAL FLOORING SYSTEM

[75] Inventors: Edward K. Hamar, Calumet, Mich.; Gordon E. Blakeman, New Berlin, Wis.

[73] Assignee: Horner Flooring Company, Dollar Bay, Mich.

[21] Appl. No.: 465,152

[22] Filed: Feb. 9, 1983

[51] Int. Cl.³ .............................................. E04C 1/10
[52] U.S. Cl. ..................................... 52/582; 403/364; 403/405.1
[58] Field of Search ............. 52/582, 578, 584, 127.5, 52/127.6, 127.7, 299, 586; 182/130, 131, 222, 223; 403/364, 405–407

[56] References Cited

U.S. PATENT DOCUMENTS

| | | | |
|---|---|---|---|
| 1,045,219 | 11/1912 | Tramill et al. | 52/584 |
| 1,048,596 | 12/1932 | Sedaj | 182/222 |
| 1,778,352 | 10/1930 | Bruce . | |
| 1,925,070 | 5/1933 | Livezey . | |
| 2,018,711 | 10/1935 | Elmendorf . | |
| 2,019,692 | 11/1935 | Mueller | 52/582 |
| 2,287,229 | 6/1942 | Carpenter | 52/299 |
| 2,335,556 | 11/1943 | Wilson . | |
| 2,382,789 | 5/1945 | Guignon, Jr. . | |
| 2,569,611 | 10/1951 | Jenkins | 403/321 |
| 2,652,753 | 9/1953 | Smith . | |
| 2,819,026 | 1/1958 | Leyendecker . | |
| 2,829,018 | 4/1958 | Valtri | 52/584 |
| 2,882,560 | 4/1959 | Plendl | 52/586 |
| 2,912,909 | 11/1959 | Hart . | |
| 3,141,392 | 7/1964 | Schneider et al. . | |
| 3,284,819 | 11/1966 | Nissen . | |
| 3,301,147 | 1/1967 | Clayton et al. . | |
| 3,319,543 | 5/1967 | Braeuninger et al. . | |
| 3,870,587 | 3/1975 | Merrell . | |
| 3,914,913 | 10/1975 | Roberts . | |
| 3,935,687 | 2/1976 | Vaughn et al. . | |
| 3,946,529 | 3/1976 | Chevaux . | |
| 4,008,548 | 2/1977 | Leclerc . | |
| 4,289,420 | 9/1981 | Davis et al. . | |

FOREIGN PATENT DOCUMENTS 1479 of 1903 United Kingdom ................ 403/364

Primary Examiner—James L. Ridgill, Jr.
Attorney, Agent, or Firm—Banner, Birch, McKie & Beckett

[57] ABSTRACT

Portable sectionalized flooring suitable for a basketball court or the like is assembled from a plurality of separate floor sections arranged in rows with each section composed of interengaged tongue and groove strips defining the floor surface, spaced stringers extending transversely of such strips and an underlayment interposed between the strips and stringers. Each section has at least one end provided with projecting fingers defined by selected strips projecting beyond strips intermediate to these selected strips for the fingers on adjoining section ends to interdigitate and thereby form interlocking finger joints. Groups of the sections are of different lengths to be assembled in rows with the interlocking finger joints of adjacent rows being staggered and latch devices are provided to interlock adjoining floor sections within each row and adjacent rows within the sectionalized flooring area.

11 Claims, 14 Drawing Figures

PORTABLE SECTIONAL FLOORING SYSTEM

BACKGROUND OF THE INVENTION

This invention relates to the flooring art and more particularly to a portable sectional flooring system especially suited for sports activities such as basketball and other like uses.

Special flooring systems for indoor and outdoor sports activities, dancing and other like uses have been proposed in the prior art. Such flooring has been formed from a variety of materials including linoleum, wood, plastic and concrete. Among the drawbacks of such prior art floors are their high initial cost, permanancy of installation and the fact that they must be made and installed at the flooring site rather than being prefabricated and carried to the desired assembly location.

Furthermore, the usual floors suitable for sports activities such as basketball present special problems in requiring a smooth playing surface which is very firm and solid for the performance of the sports activity thereon. The problems in meeting these flooring requirements to be suitable for sports activities played thereon are exacerbated when attempts have been made to provide these floors in a portable and/or sectionalized form of construction.

Still, there are many environments and applications where permanent installation of a sports activity type of floor is not dictated or justified. Some locations may require that the sports activity type flooring be removable such that the location is succeptable to utilization for purposes other than sports activities.

These needs have given rise to the necessity for providing a portable sectionalized flooring system which not only can be laid expeditiously and easily when required for performance of the sports activity thereon, but which also will furnish the required smooth and solid surface to meet the prerequisites for the sports activity, keeping in mind that a sports playing activity such as basketball also requires that the playing floor have the resiliency characteristics of permanently installed basketball courts. Without such floor resiliency for playing the sports activity a portable sectional flooring system may be found unsuitable.

Prior art efforts to solve the above problems while still meeting the stringent requirements for playing surfaces suitable for sports activities have been dificient, particularly with respect to efforts to develop an acceptable sectional flooring system. Aside from the excessive cost involved in initial fabrication of the sectionalized flooring systems which have been heretofore proposed for sports activity use, the time and consequent expense of putting down these temporary sectionalized floors and thereafter removing them subsequent to the playing activity have all contributed to their general unacceptability. Furthermore, where these prior art sectionalized floors must be repeatedly put down and taken up before and after successive sports activities, prior flooring systems suitable for such purpose have frequently required complicated and separate parts for their assembly, parts that may be easily lost or misplaced while the floor sections are in their disassembled state of nonuse or in storage.

SUMMARY OF THE INVENTION

In view of the above and other deficiencies of the known prior art, it is the aim of this invention to provide a prefabricated, easily transportable sectional flooring system for sports activities such as basketball and other activities which can be quickly assembled and installed in a variety of environments.

Thus, the invention involves portable sectionalized flooring assembled from a plurality of separate floor sections, these sections being longitudinally aligned into rows and the rows arranged adjacent one another to define the flooring area which would be suitable for a basketball court or other activity. Each floor section is composed of interengaged tongue and groove wood floor strips defining the floor surface with spaced stringers extending transversely of such strips and an underlayment layer interposed between these strips and stringers. Further, each section has at least one end provided with projecting fingers defined by selected strips projecting beyond strips intermediate these selected strips for the fingers on adjoining section ends to interdigitate and thereby form interlocking finger joints.

Groups of the sections are of different lengths so that when they are assembled into the rows and the rows arranged adjacent each other these interlocking finger joints of adjacent rows are staggered. Latch devices are provided to interlock the adjoining floor sections within each row and also interlock adjacent rows within the sectionalized flooring area.

Other important features and advantages of the invention will be apparent from the following description and the accompanying drawings, wherein, for purposes of illustration only, a specific form of the invention is set forth in detail.

DETAILED DESCRIPTION OF A PREFERRED EMBODIMENT

Figure 1:
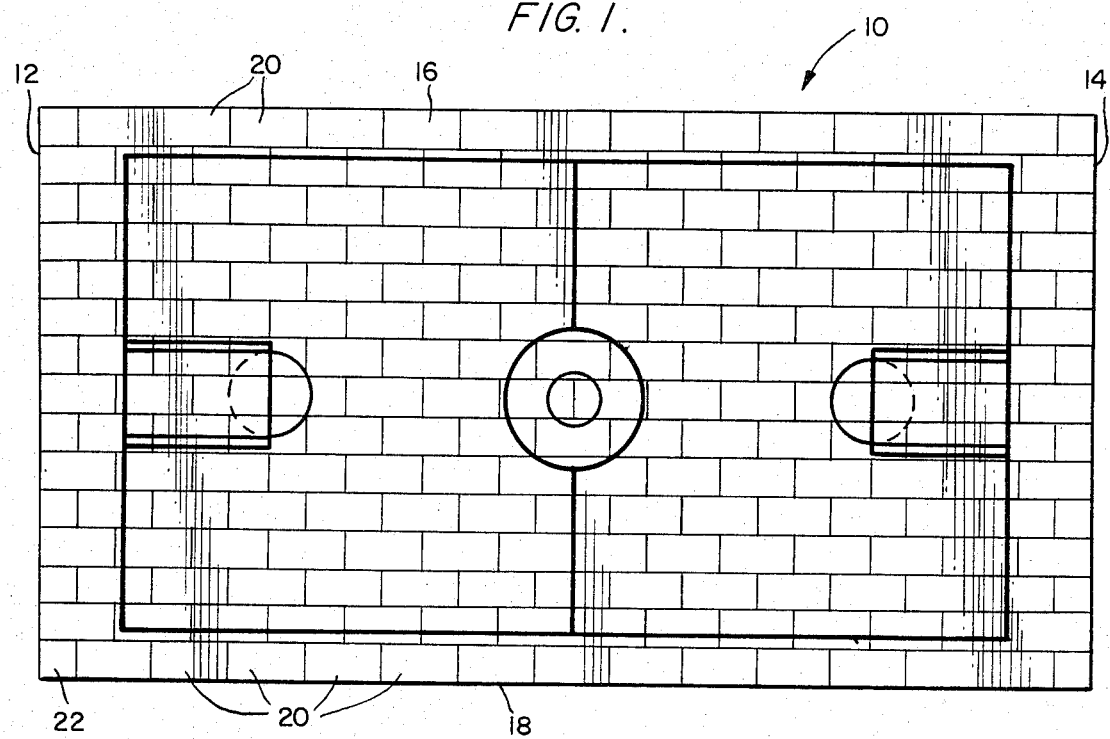
FIG. 1 is a plan view of an assembled sectionalized flooring in accordance with the invention displaying appropriate markings for a basketball court.

FIG. 1 provides an overall plan view of a completed sectionalized flooring area 10 defining a plane shown appropriately marked to provide the playing surface for a basketball court. This sectionalized basketball floor would normally have a size of 60 feet by 112 feet in its construction but obviously the floor area size is subject to wide variation by assembling more or less floor sections. Separate floor sections are assembled longitudinally aligned in rows with these rows placed adjacent one another to define the flooring area. These floor sections may be appropriately constructed to be 4 feet in width with two groups of sections having different lengths of 8 feet and 4 feet, respectively.

It may thus be seen from FIG. 1 that in assembly of these two groups of different length sections into the flooring area, the large sections and small sections making up the two groups are positioned within the rows so as to dispose the end joints between adjoining sections in adjacent rows in staggered relationship.

This staggered joint relationship is advantageous in promoting strength for the overall assembled sectionalized flooring area. Also the staggered joints avoid the presence of a joint which extends transversely for the full width of the flooring area. Such a full width transverse joint might interfere with providing the requisite smooth playing area for the sports activity to be performed on the sectionalized flooring. In its final assembled appearance and function for sports activities the completed sectionalized flooring is to present the appearance of a permanently installed basketball floor.

Figure 2:
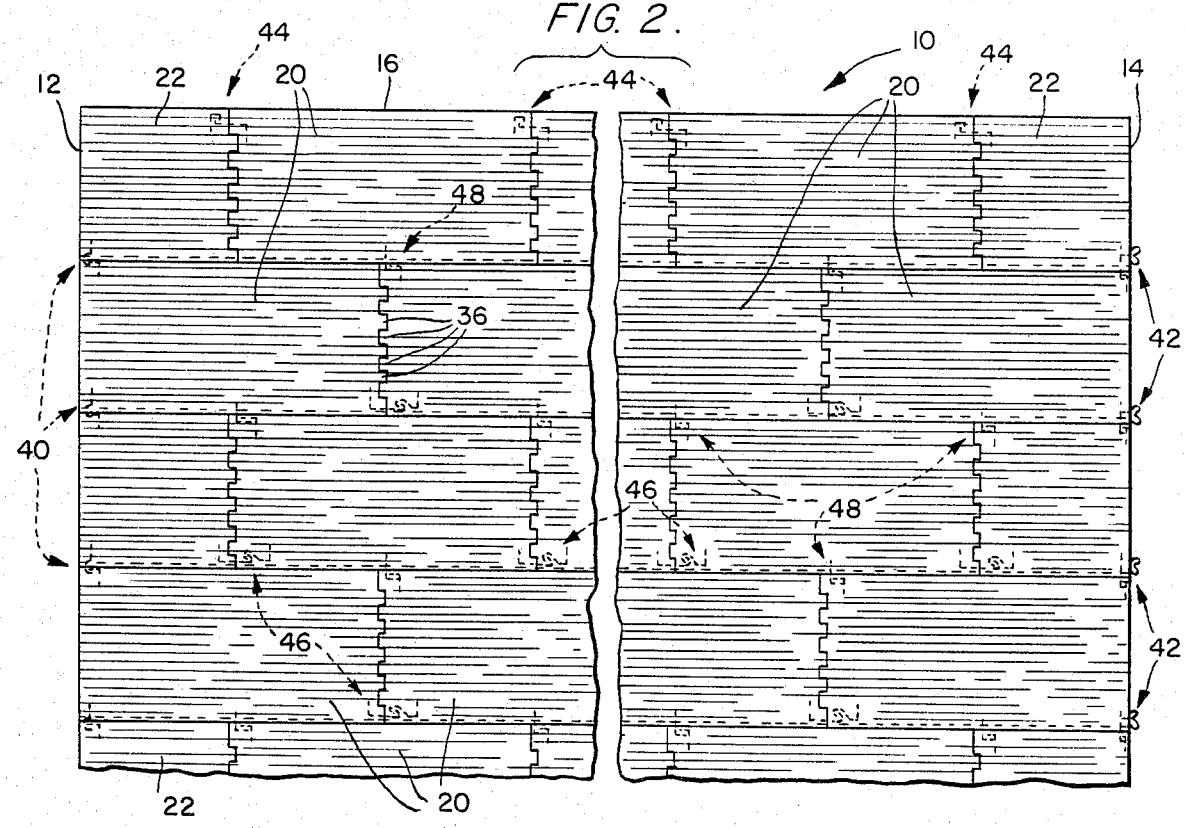
FIG. 2 is an enlarged plan view of two corner segments of the sectionalized flooring invention, with the latch devices to interlock floor sections shown in phantom lines.
Figure 3:
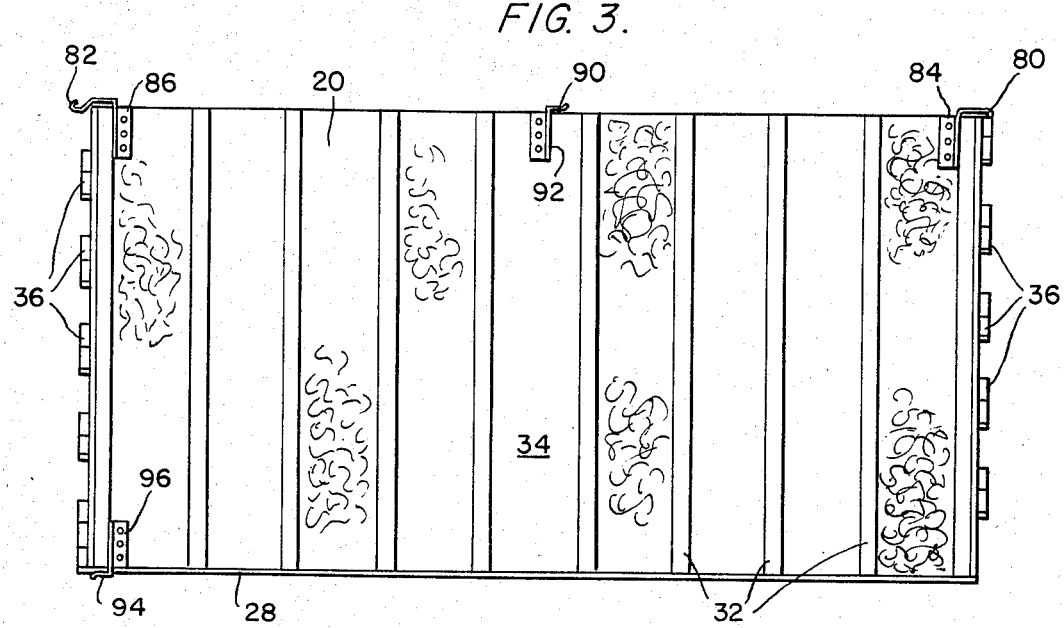
FIG. 3 is an underside view of a large floor section showing the latch devices affixed in appropriate positions.
Figure 4:
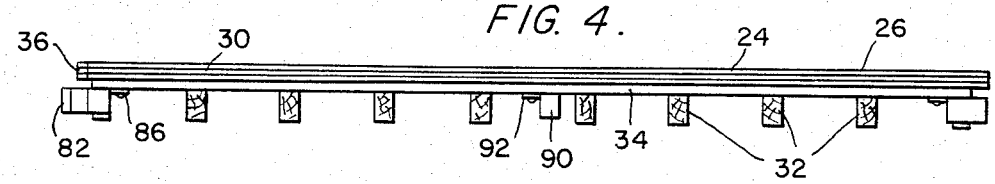
FIG. 4 is a side elevational view of the floor section of FIG. 3.
Figure 5:
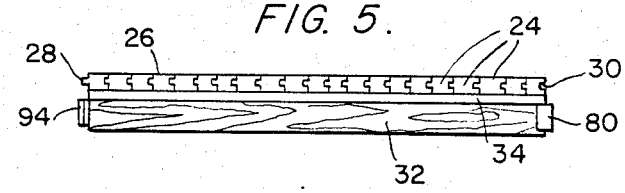
FIG. 5 is an end elevation of the floor section of FIG. 3.
Figure 6:
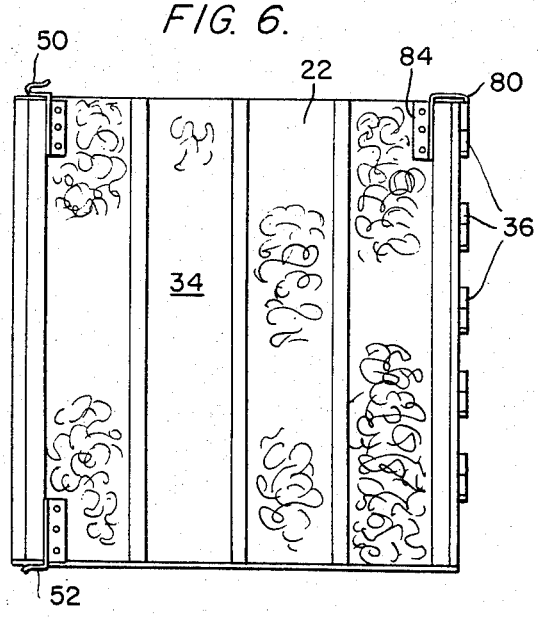
FIG. 6 is an underside view of a small floor section for the leading edge of the flooring area with latch devices approximately affixed thereto.
Figure 7:
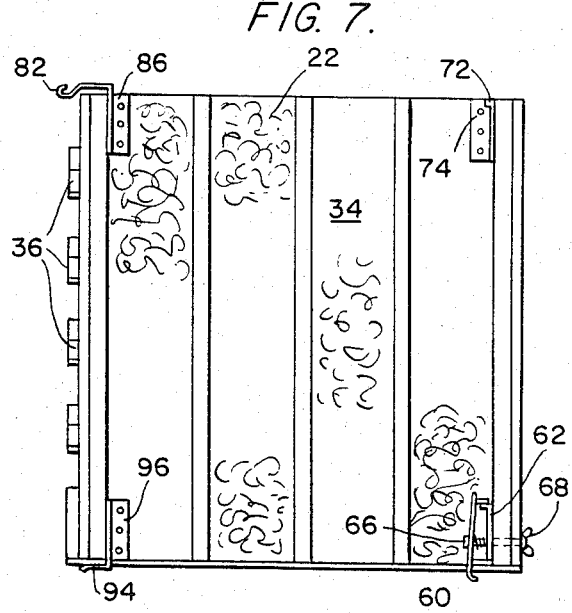
FIG. 7 is an underside view of a small floor section for the trailing edge of the flooring area with latch devices shown affixed thereto.

FIG. 2 shows two corner segments of an assembled sectionalized flooring area 10. The left segment illustrates the latch devices in phantom lines employed at the leading edge 12 for the flooring area and the right segment on FIG. 2 illustrates the latch devices shown in phantom lines as employed at the trailing edge 14 of the flooring area 10. The latch devices to interlock adjoining floor sections within the first row which extends along side 16 of flooring area 10 are also shown in phantom lines along the top of FIG. 2. Similarly, the latch devices to interlock the adjoining ends of sections making up the last row extending along side 18 of the flooring area 10 may be seen on FIG. 13.

Figure 12:
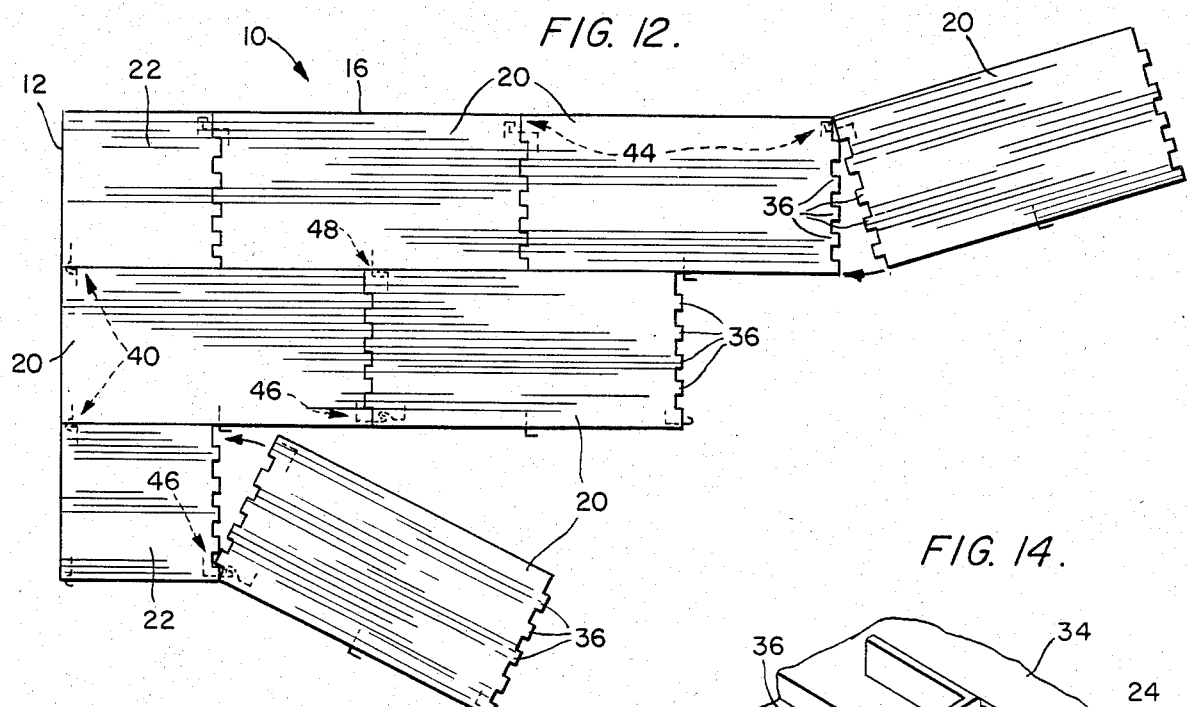
FIG. 12 is a plan view of a flooring area corner segment diagrammatically illustrating interlocking assembly of the initial floor sections.
Figure 13:
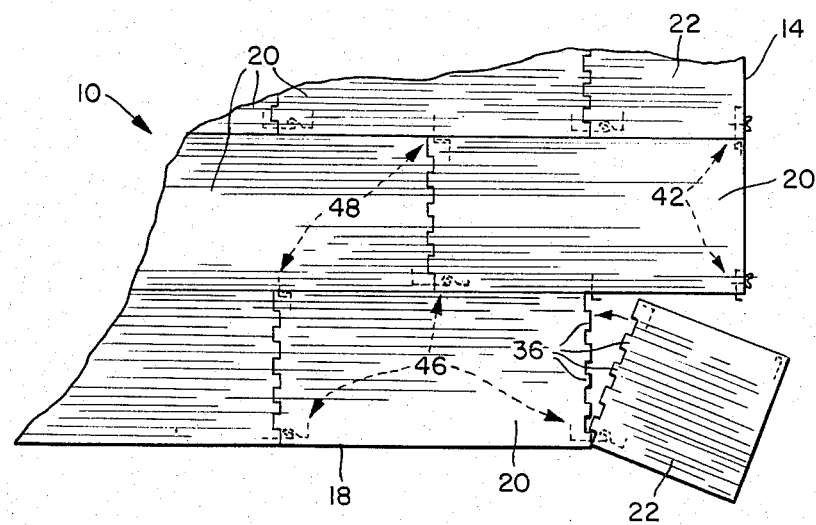
FIG. 13 is plan view similar to FIG. 12 diagrammatically illustrating assembly of the last floor section.

FIGS. 12 and 13 may be referred to as best illustrating the manner in which individual floor sections are swung into assembled relationship with one another so as to interengage the elements of the respective latch devices such that adjoining floor sections within each row are interlocked and likewise adjacent rows within the sectionalized flooring area 10 are interlocked with one another.

The sectionalized flooring area 10 is assembled from a plurality of separate floor sections falling into either of two size groups having respectively different lengths. The first group consists of large sections 20 while the second group is made up of small sections 22. As a practical matter, in fabrication and subsequent assembly at the site the large sections 20 are preferably four feet wide by eight feet long while the small sections 22 are approximately four feet by four feet. As may be easily appreciated from the plan view of the sections shown on FIG. 1, by appropriately positioning large and small sections 20 and 22 in the rows of the flooring area 10 the joints between the ends of longitudinally aligned sections can effectively be staggered as between adjacent rows.

Aside from the different size lengths between the two groups of sections 20 and 22, the construction of each floor section is identical. Of course, the particular elements for the latching devices and their positioning on the underside of the floor sections 20 and 22 will differ depending upon the particular floor section involved. This positioning and selection of the latch device elements for the different floor sections 20 and 22 will be described in detail hereinafter.

The basic composition of the floor sections 20 and 22 may best be understood by reference to FIGS. 3-7 on the drawings. Thus, each section 20 and 22 is composed of interengaged tongue and groove wood flooring strips 24 which collectively define the floor surface 26 of each floor section.

These strips 24 preferably are conventional tongue and groove wood flooring. For example, for a portable sectionalized basketball court floor they could be hard maple 25/32 inch×2¼ inch face. Thus as will be seen from FIG. 5, the interengaged tongue and groove strips 24 provide the floor section with a tongue 28 extending longitudinally along one side of the panel and a groove 30 extending longitudinally along the opposite side of the panel.

Each floor panel 20 and 22 is further characterized by spaced stringers 32 which extend transversely of the flooring strips 24. A layer of underlayment 34 is interposed between the flooring strips 24 and the stringers 32.

Obviously, the sizes and materials used in the components making up the floor sections 20 and 22 may be selected from a wide variety of sizes and/or materials. Merely to exemplify a preferred makeup of these components the following example may be recited. The flooring surface 26 consisting of the tongue and groove strips 24 are 25/32×2¼ tongue and groove strips. The layer of underlayment 34 for the large floor sections 20 will be 48 inches×96 inches with a ½ inch thickness. The stringers 32 may be of 2 inch×3 inch Douglas Fur framing. In assembling the components 24, 32 and 34 for each floor section 20 and 22, eight penny specially coated nails are preferably employed. The elements making up the latch devices which are described in detail hereinafter and which interlock adjoining floor sections within each row and interlock adjacent rows within the overall flooring area 10 are preferably of 3/16 inch steel.

An important feature of the portable sectionalized flooring resides in the floor sections 20 and 22 having interlocking finger joints between the ends of adjoining longitudinally aligned sections in each row. Thus, each floor section 20 and 22 has at least one end thereof provided with projecting fingers 36. As may be easily discerned from the plan view segments shown on FIG. 2, in the layout of floor sections 20 and 22 each floor section which is disposed at the leading or trailing edge of the flooring area 10 has only one end provided with projecting fingers 36. On the other hand, all of the floor sections 20 that lie embedded between longitudinally aligned floor sections in a row have both ends thereof provided with projecting fingers 36. In the arrangement illustrated on FIG. 2, all of the small floor sections 22 are disposed at either the leading or trailing edge of the flooring area 10 and thus each small section 22 has only one end provided with the projecting fingers 36.

The projecting fingers 36 are defined by selected strips 24 of the floor section 20 or 22 projecting beyond strips 24 which are intermediate these selected strips. Thus, the projecting fingers 36 on adjoining longitudinally aligned sections interdigitate to form interlocking finger joints within each row.

It will be recognized that the projecting fingers 36 may be defined by one or more of the strips 24 projecting beyond the floor section end to form the finger 36. For example, in the construction of the floor sections 20 and 22 shown on FIGS. 3–7, a pair of adjacent strips 24 project beyond the strips 24 that are intermediate this pair of strips. Thus, the fingers 36 are two strips 24 in width as illustrated on these Figures.

Figure 9:
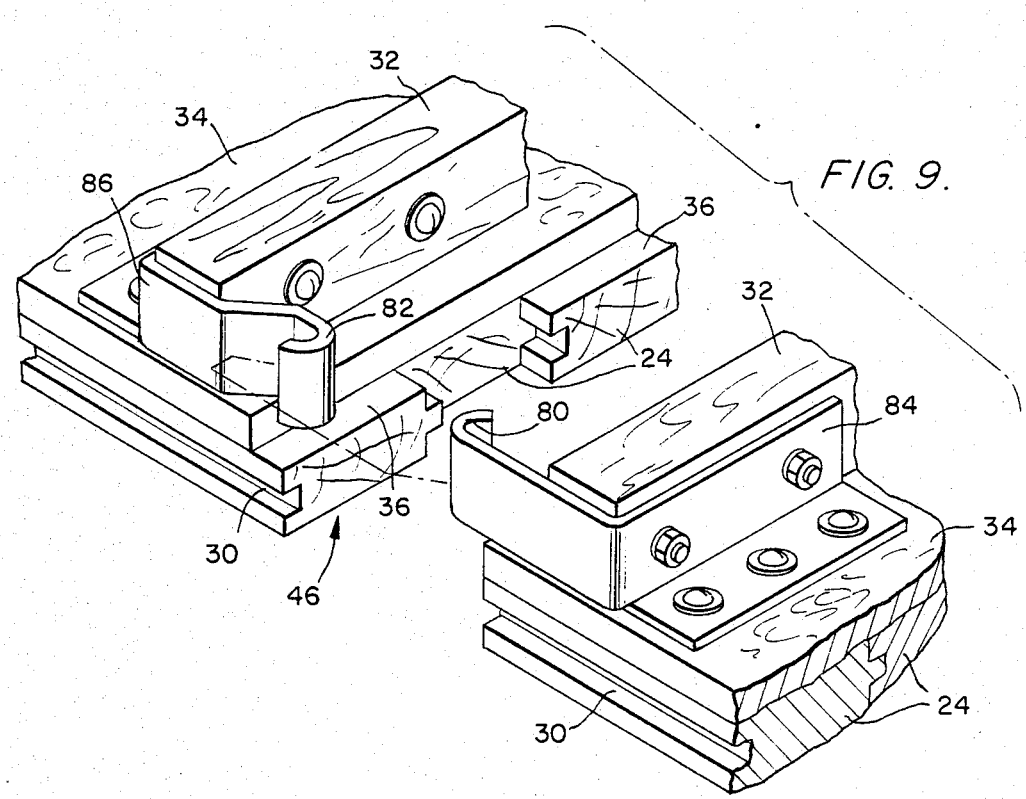
FIG. 9 is an exploded perspective view of the elements for the hingedly interhooked latch device used at adjoining ends of longitudinally aligned floor sections.
Figure 14:
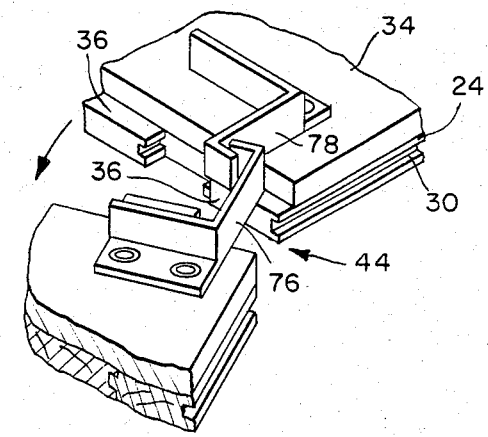
FIG. 14 is an exploded perspective view of the hook latch device elements employed between adjoining ends of the first row of floor sections.

On the other hand, it will be seen from FIGS. 9 and 14, that the fingers 36 may have a single strip 24 width with the single strip 24 intermediate the strips forming fingers 36 being recessed inbetween. This latter single strip width for the fingers 36 as shown on FIGS. 9 and 14 is deemed preferable in obtaining a more well defined interdigitation between the strips to form smoother and stronger interlocking finger joints within each of the rows of floor sections 20 and 22.

In this respect, it will be appreciated that each projecting finger 36 defined by the selected strips projecting beyond intermediate strips on the floor section ends have tongue and groove configurations. Thus, the act of interdigitating the fingers 36 at the ends of longitudinally aligned sections causes the interlocking finger joints to be characterized by having a tongue and groove interfit. Thereafter, in finishing the floor area surface by power-sanding, application of sealer, finish, etc., the portable sectionalized flooring 10 can be completed with the appearance of the sections and joints between sections being that of a permanent playing surface for sports activities such as basketball.

Reference may now be made to the latch devices which are provided to interlock adjoining floor sections 20 and 22 within each row and interlock adjacent rows within the overall sectionalized flooring area 10. Referring to FIG. 2, which is a plan of two corner segments of the flooring area 10 will be helpful in that it shows in phantom lines the different forms of latch devices and their positioning to interlock the floor sections 20 and 22 into the overall sectionalized flooring area 10.

Thus, a slidably interengaged latch device 40 is effective between the section ends of adjacent rows forming the leading edge of the flooring area 10. Similarly, a manually releasable connector 42 is mounted to be effective between the section ends of each of the adjacent rows forming the trailing edge of this flooring area. The slidably interengaged latch device 40 is illustrated on FIG. 8 and the releasable connector 42 is illustrated on FIG. 11.

The first row of floor sections 20 and 22 shown at the top on FIG. 2 extending along side 16 includes a hook latch device 44 having its elements appropriately affixed to the appropriate corners of the floor sections 20 or 22 to function in interlocking the adjoining ends of longitudinally aligned sections making up this first row of the flooring area 10. This hook latch device 44 is shown on FIG. 14.

A hingedly interhooked latch device 46 has its elements mounted adjacent the corners of adjacent ends of longitudinally aligned sections making up the last row of the flooring area 10 extending along side 18 as may be seen from the corner segment illustrated on FIG. 13. It also is to be noted as shown on FIGS. 2 and 13 that this hingedly interhooked latch device 46 is employed as the interlocking latch device for a majority of the corners on adjoining section ends that are embedded or located interiorly of the leading and trailing edges, and first and last rows making up the flooring area 10. This hingedly interhooked latch device 46 may be best seen on FIG. 9.

A slide latch device 48 is utilized with the elements making up the device mounted on adjacent corners of the joints between floor sections which terminate intermediate the length of a floor section that is located in an adjacent row within the flooring area 10. This slide latch device 48 is best seen on FIG. 10 wherein it will be easily visualized how device 48 functions to interlock adjacent rows of floor sections within the sectionalized flooring area.

Figure 8:
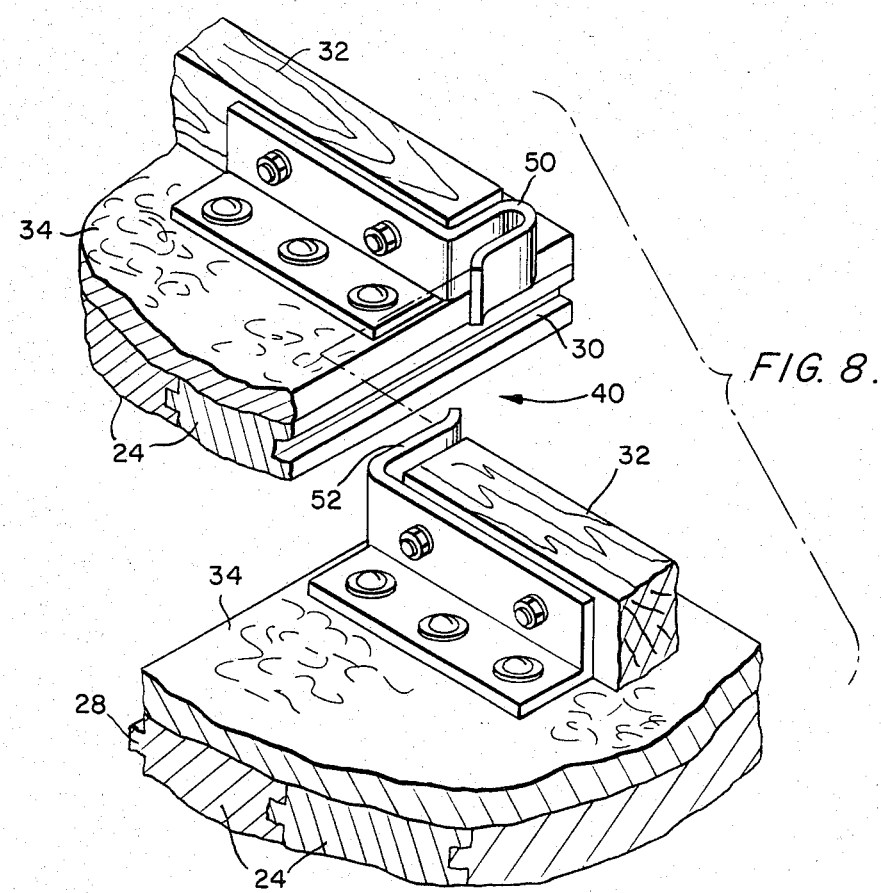
FIG. 8 is an exploded perspective view of the interengaging elements for the slidably interengaged latch device employed along the leading edge of the flooring area.

The slidably interengaged latch device 40 as shown on FIG. 8 consists of a first element having a reversely bent U hook 50 which is secured as by suitable bolts to an end of a stringer 32 and by wood screws to the underlayment 34. A second element of device 40 is provided by a bracket having a tab 52 which slidably interengages with the U hook 50 with this bracket being bolted to the end of a stringer 32 and screwed to underlayment 34 at the corner of the floor section in the adjacent row. The ends of the floor sections being interlocked by slidably interengaged latch device 40 are those lying along and forming the leading edge 12 of the flooring area 10 as shown on FIG. 2.

Figure 11:
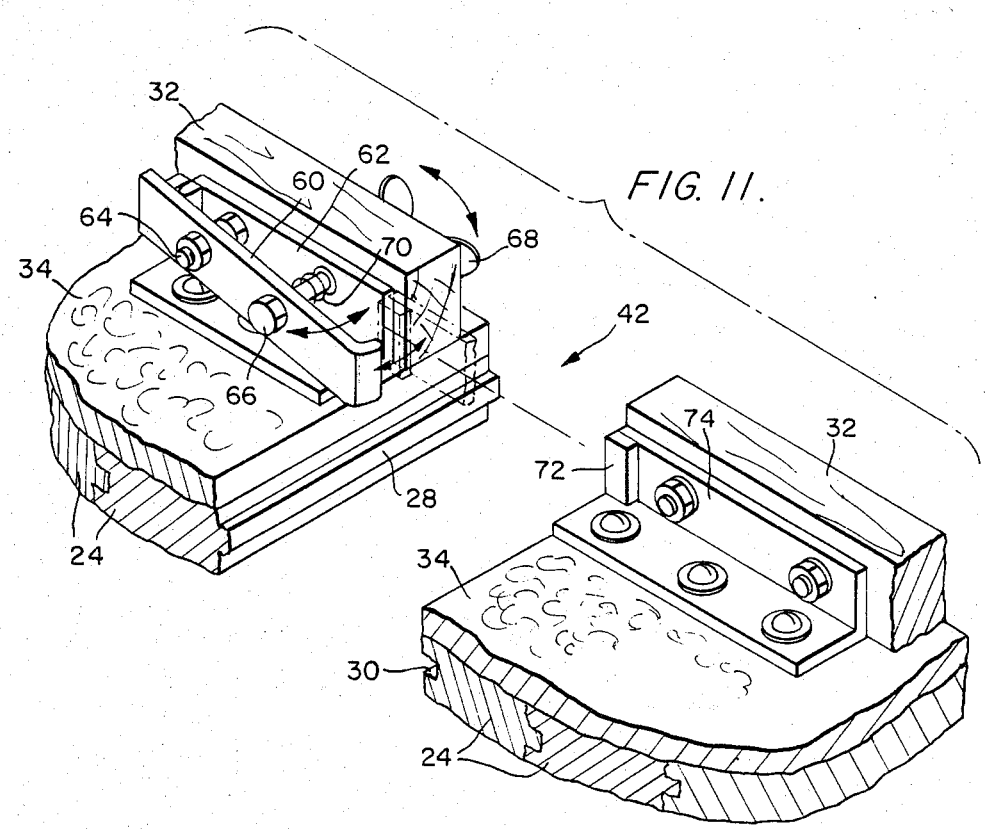
FIG. 11 is an exploded perspective view of the elements for the releasable connector employed between section ends at the trailing edge of the flooring area.

The releasable connector 42 employed between the section ends of adjacent rows which form the trailing edge 14 of the flooring area 10 is best seen on FIG. 11. This releasable connector 42 includes a clamping member 60 which is movably mounted on a bracket 62, such bracket being bolted and screwed to an end of stringer 32 and underlayment 34 adjacent the corner of floor section edge 14 at the trailing end of the flooring area 10. Clamping member 60 is shown retained on a suitable support pin 64 with an actuating screw 66 extending through member 60 and outwardly through the stringer 32 to which bracket 62 is affixed. A suitable wingnut 68 is threaded onto the outer end of adjusting screw 66 to enable activation and release of releasable connector 42. A suitable coil spring 70 may be provided on adjusting screw 66 intermediate clamping member 60 and its bracket 62 to bias the clamping member 60 away from bracket 62.

It may be easily seen from FIG. 2 that all of the wingnuts on releasable connectors 42 are exposed at the trailing edge of the flooring area. Thus, the wing nuts 68 may be manually other otherwise tightened onto adjusting screws 66 so that the clamping members of the releasable connectors 42 are squeezed down toward the stringer 32 with which they are associated in the direction of the arrows shown on FIG. 11.

The second element of releasable connector 42 is provided by retainer clip 72 which is mounted adjacent the corner of the other section to be latched by connector 42. Clip 72 is carried by bracket 74 that is suitably bolted and screwed to the stringer 32 and underlayment 34 adjacent the corner of the section end which is to be interlocked at the trailing edge 14 of the flooring area 10.

It will be seen from FIG. 11 that when the elements of releasable connector 42 are brought together by the adjacent rows having their tongue and groove strips interengaged, the clip 72 will have the position as shown in phantom on FIG. 11. In this relationship, the wingnut 68 may be tightened onto adjusting screw 66 whereupon clamping member 60 will have the hook end thereof brought down into snug engagement with clip 72 on bracket 74. Thus, the adjacent rows forming the trailing edge 14 of the flooring area 10 will individually be interlocked along this trailing edge. Still they are easily releasable for disassembly of the portable sectionalized flooring by simply loosening the wing nuts 68 of connectors 42 which are exposed outwardly of the trailing edge 14 of flooring area 10.

Referring to FIG. 14, the hook latch device 44 is illustrated as it is associated with each of adjoining ends of longitudinally aligned floor sections making up the first row of the flooring area 10 extending along side 16 as illustrated on FIG. 2. Latch device 44 is provided by an inwardly facing hook 76 suitably secured by bolts and screws as appropriate to one of the adjoining ends of longitudinally aligned sections making up the first row of the flooring area 10. Similarly, an outerwardly facing hook 78 is suitably secured to the other end of the aligned sections for the hook latch device 44 to be disposed between adjoining ends of these longitudinally aligned sections in the first row.

The hingedly interhooked latch device 46 is shown on FIG. 9. This device includes a pair of reversely curled hooks 80 and 82. Hook 80 faces inwardly as carried by a bracket 84 that is suitably secured by bolts and screws to the stringer 32 and underlayment 34 at the corner of the floor section which it is to interlock with the corner of the adjoining floor section. Likewise, reversely curled hook 82 faces outwardly relative to the corner of the floor section on which it is mounted by its bracket 86 being appropriately bolted and screwed to the stringer 32 and underlayment 34 of the flooring section end that it is to interlock.

It will be appreciated that important to the firm and sturdy interlocking provided by latch device 46, the reversely curled hooks 80 and 82 are swung into hingedly interlocking relation with one another incident swinging a floor section into position in the manner generally depicted on FIGS. 12 and 13.

Figure 10:
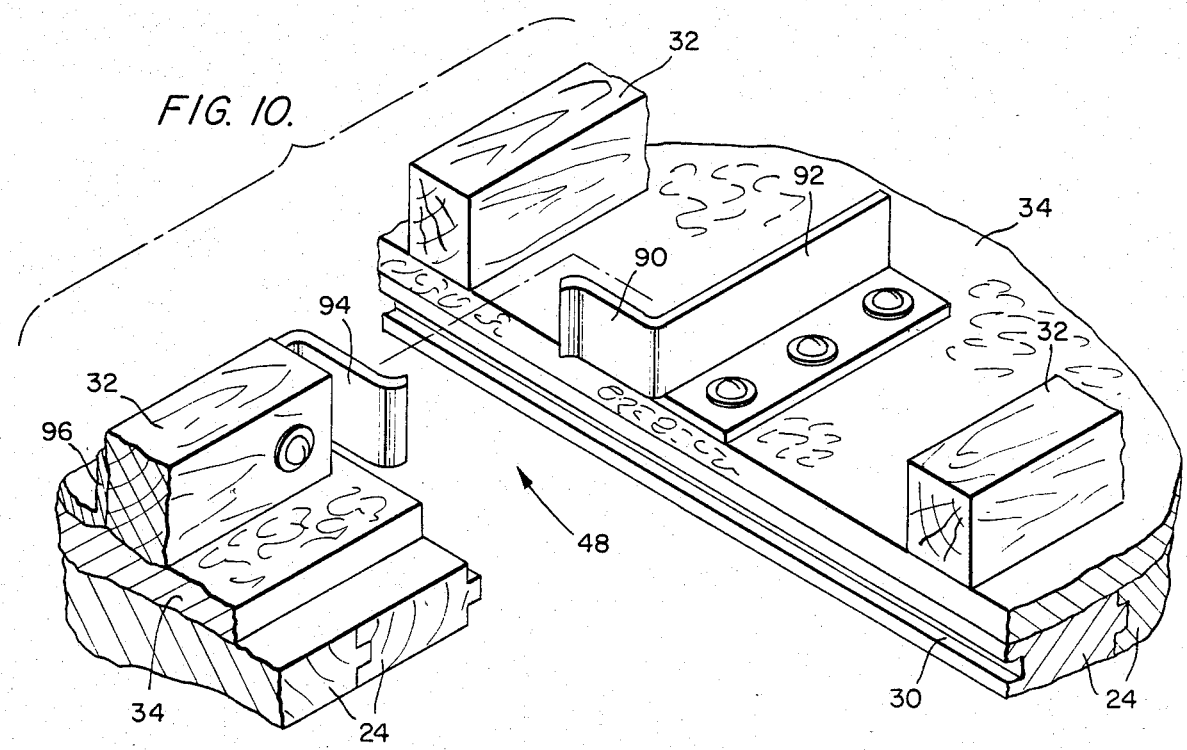
FIG. 10 is an exploded perspective view of the elements for the slide latch employed intermediate the length of a floor section.

The slide latch device 48 shown on FIG. 10 is employed adjacent the corner of joints between floor section where the particular joint terminates intermediate the length of a floor section in an adjacent row. Thus, as shown on FIG. 10 a generally flat tab 90 is carried by a bracket 92 which is appropriately secured as by screws to the underlayment 34 at a location intermediate the length of the floor section. Likewise, a generally flat tab 94 has its mounting bracket 96 appropriately secured as by bolts and screws to the stringer 32 and underlayment 34 at a floor section corner in an adjacent row of floor sections.

Again, it will be easily seen from FIG. 2 in comparison with FIG. 10 how the slide latch devices 48 are employed adjacent the corners of the joints between floor sections where these joints terminate intermediate the length of a floor section in an adjacent row.

The overall manner of assembling a plurality of separate floor sections 20 and 22 will be readily understood from the above description of specific elements and components making up the floor sections and latch devices that are provided to interlock adjoining floor sections within each row and adjacent rows within the overall sectionalized flooring area 10. This assembly produces a strong portable sectionalized flooring for the performance of athletic activities thereon such as the basketball court floor shown on FIG. 1.

The assembly techniques for putting together the portable sectionalized flooring from a plurality of separate floor sections 20 and 22 can involve a variety of procedural steps. One appropriate procedure may be easily understood by reference to FIGS. 12 and 13.

Starting with the small floor section 22 such as shown at the upper left corner on FIG. 12, several floor sections may have their latch devices 40 slidably interengaged to form at least a portion of the leading edge 12 of the flooring area 10. Successive floor sections may be longitudinally aligned with their hook latch devices 44 appropriately interengaged as by swinging a floor section 20 down into interdigitating relation of the fingers 36 such as shown at the right in the first row on FIG. 12.

The hingedly interhooked latch devices 46 come into play by swinging a floor section 20 upwardly into position as diagrammatically illustrated by the position of the bottom section 20 on FIG. 12. There it is shown being swung into position to interdigitate the projecting fingers 36 as between the section being moved into place and the small section 22 already shown in position. It will be appreciated that this movement of the large section 20 into the interlocking finger joints with section 22 will also bring the slide latch device 48 into its interlocking function to tie this row with the intermediate length of the floor section in the adjacent row.

At the trailing edge 14 of the flooring area 10 such as shown on FIG. 13, the releasable connectors 42 will have their elements brought together with the tightening wing nut 68 on adjusting screw 66 for each connector 42 being exposed for easy tightening of the connectors 42 at the junction between each of the adjacent rows forming the trailing edge 14 of the flooring area 10.

With tightening down of the adjusting nuts 68 on the releasable connectors 42 the entire flooring area is effectively locked in assembled condition. It will be appreciated that disassembly of the portable sectionalized flooring may be easily initiated by simply loosening the wing nuts to release the releasable connectors 42 at each of the junctions between adjacent rows forming the trailing edge 14 of the flooring area 10. Once these connectors have been released the individual floor sections may be easily disassembled by basically reversing the procedure that was employed in their assembly.

From the above description it will be apparent that the portable sectionalized flooring may have the floor sections 20 and 22 prefabricated and built under factory controlled conditions to achieve precision in the final dimensions and strength of the individual sections. Further, the floor sections may be easily assembled into the sectionalized flooring area 10 such as to provide a playing surface for sports activities and likewise be easily disassembled as may be necessary where the playing floor is not to be or can not be reasonably maintained in a permanent location.

The latch devices utilized in interlocking the flooring sections are all concealed from view. The interdigitating fingers of the sections that form interlocking finger joints between adjoining sections provide strong joints and ones which can be effectively finished for smoothness as necessary in a sports activity playing surface. Likewise, by the floor sections being of two groups having different lengths the sections can effectively be assembled in rows with the different lengths positioned within these rows to dispose the joints between sections in adjacent rows in staggered relationship. This is advantageous in that the staggered joints preclude the presence of a joint extending continuously for the entire width of the playing floor surface.

Having described a preferred embodiment in detail, it will be recognized that the foregoing is considered as illustrative only of the principles of the invention. Further, since numerous modifications and changes will readily occur to those skilled in the art, it is not desired to limit the invention to the exact construction, materials, assembly, etc. shown and described. Accordingly, all suitable modifications and equivalents may be resorted to to the extent that they fall within the scope of the invention and claims appended hereto.

We claim:

1. Portable sectionalized flooring for a basketball court or the like comprising:
   a plurality of equal width floor sections directly supported on a planar base surface including first and second groups of sections, each group having a different length, said sections being assembled in rows to form a flooring area which defines a plane with the different lengths of said groups positioned within said rows to dispose the joints between sections in adjacent rows in staggered relationship; each said section having interengaged tongue and groove strips defining a floor surface, each said section having an exposed tongue extending along one side of the section and an exposed groove extending along the other side of the section, said exposed tongue and said exposed groove on the sections in adjacent rows being directly interengaged, at least one end of each said section having projecting fingers defined by selected strips of the section projecting beyond strips intermediate said selected strips whereby said fingers on adjoining longitudinally aligned sections form interlocking fingers joints in each of said rows; and
   latch means connected to each said section disposed beneath said floor surface interlocking adjoining floor sections within each of said rows and interlocking adjacent rows within said flooring area, said latch means including a series of latch devices with each said device having a pair of separate interengageable elements, said elements of each device being connected, respectively, adjacent the edges of two adjoining floor sections, said pair of elements of each said device being interlockingly interengaged preventing transverse separation of adjacent sections in adjacent rows and preventing longitudinal separation of adjoining longitudinally aligned sections within each row, said latch devices being interengaged and disengaged solely by swinging said two adjoining floor sections relative to each other in said plane of said flooring area.

2. Portable sectionalized flooring as recited in claim 1 wherein said selected strips alternate with said intermediate strips to form said projecting fingers at alternate ones of said strips within each said section.

3. Portable sectionalized flooring as recited in claim 1 wherein each said section has spaced stringers extending transversely of said strips with the ends of said stringers terminating beneath said exposed tongue and said exposed groove, respectiely, and an underlayment interposed between said strips and said stringers.

4. Portable sectionalized flooring as recited in claim 3 wherein said strips are of wood.

5. Portable sectionalized flooring as recited in claim 1 wherein said latch means includes a slidably interengaged latch device between the section ends of each of adjacent rows forming the leading edge of said flooring area, and a releasable connector between the section ends of each of adjacent rows forming the trailing edge of said flooring area.

6. Portable sectionalized flooring as recited in claim 5 wherein said releasable connector includes a clamping member mounted adjacent a corner of one section end, a retainer clip mounted adjacent a corner of the other section end to be latched by said connector, and means to move said member into clamping engagement with said clip.

7. Portable sectionalized flooring as recited in claim 1 wherein said latch means includes a hook latch device between each of the adjoining ends of longitudinally aligned sections making up the first row of said flooring area, and a hingedly interhooked latch device between each of the adjoining ends of longitudinally aligned sections making up the last row of said flooring area.

8. Portable sectionalized flooring as recited in claim 7 wherein said hingedly interhooked latch device includes a pair reversely curled hooks mounted, respectively, adjacent the corners of the adjoining ends of the longitudinally aligned sections to be latched by said hooks.

9. Portable sectionalized flooring as recited in claim 7 wherein said latch means includes a slide latch device adjacent the corners of the joints between sections which terminate intermediate the length of a section in an adjacent row.

10. Portable sectionalized flooring as recited in claim 7 wherein said latch means further includes a slidably interengaged latch device between the section ends of each of adjacent rows forming the leading edge of said flooring area, and a releasable connector between the section ends of each of adjacent rows forming the trailing edge of said flooring area.

11. Portable sectionalized flooring as recited in claim 10 wherein said latch means additionally includes a slide latch device adjacent the corners of the joints between sections which terminate intermediate the length of a section in an adjacent row.

* * * * *